(12) United States Patent
Mori et al.

(10) Patent No.: US 8,215,701 B1
(45) Date of Patent: Jul. 10, 2012

(54) AUTOMOTIVE VEHICLE DOOR SEAL

(75) Inventors: Masatoshi Mori, Columbus, OH (US); Kenichi Kitayama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/974,010

(22) Filed: Dec. 21, 2010

(51) Int. Cl.
*B60J 5/00* (2006.01)

(52) U.S. Cl. .................................. 296/146.9; 49/482.1

(58) Field of Classification Search ............... 296/146.9; 49/482.1
See application file for complete search history.

(56) References Cited

U.S. PATENT DOCUMENTS

| 4,976,069 A | 12/1990 | Arima et al. |
| 4,998,946 A | 3/1991 | Nozaki |
| 5,007,761 A * | 4/1991 | Wulff et al. ................... 403/287 |
| 5,127,702 A | 7/1992 | Akachi et al. |
| 7,124,539 B2 * | 10/2006 | Tsuchida et al. ............. 49/490.1 |

FOREIGN PATENT DOCUMENTS

| JP | 08-108749 | 4/1996 |
| JP | 11-011150 | 1/1999 |

* cited by examiner

*Primary Examiner* — Dennis Pedder
(74) *Attorney, Agent, or Firm* — Fay Sharpe LLP

(57) ABSTRACT

An automobile vehicle including a vehicle body having a passage receiving a door. A plurality of sealing elements are located between the door and the vehicle body. A first sealing element having a resilient surface portion and a relatively more rigid body portion shaped to engage a body flange is provided to seal an upper region of the passage. A second sealing element comprising a resilient section and a mating section adapted to mate with a door panel is provided and cooperates with the vehicle body to seal the lower region of the passage.

21 Claims, 4 Drawing Sheets

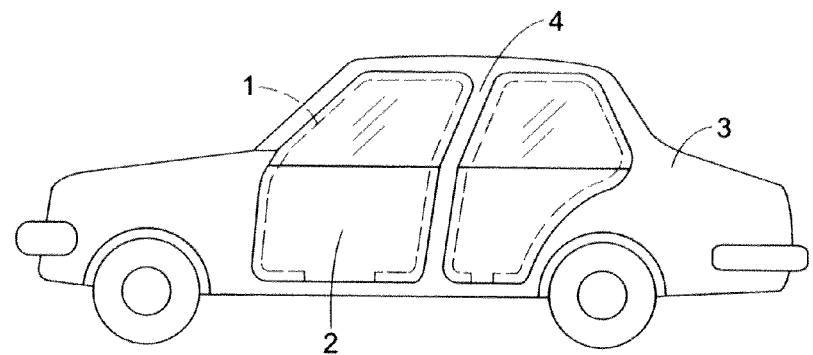
FIG. 1
(PRIOR ART)
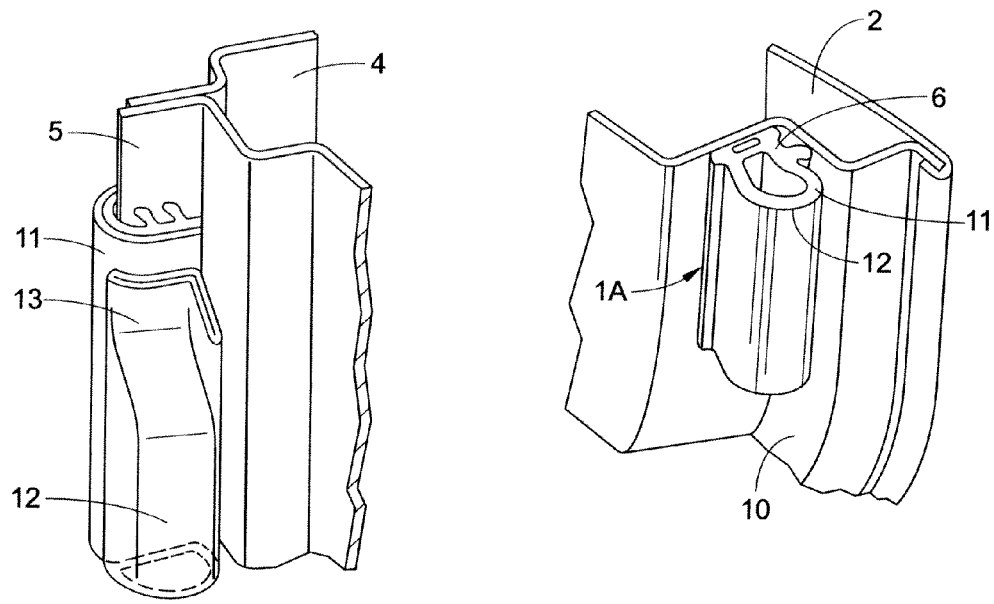
FIG. 2
(PRIOR ART)
FIG. 3
(PRIOR ART)

US 8,215,701 B1

AUTOMOTIVE VEHICLE DOOR SEAL

BACKGROUND

The present exemplary embodiment relates to a seal structure for a motor vehicle. It finds particular application in conjunction with sealing the circumference of a motor vehicle door, and will be described with particular reference thereto. However, it is to be appreciated that the present exemplary embodiment is also amenable to other like applications.

A weather strip seal is traditionally attached to one of an edge of a door opening or a periphery of a door of a motor vehicle to seal the joint between door and vehicle body. The weather strip seal of this type is generally composed of a base portion attached along one of an edge of a door opening and a periphery of a door, and a tubular sealing portion projecting from the base portion which contacts the opposing surface for effecting a seal.

Various forms of traditional door weather seals are described in U.S. Pat. No. 4,998,946 and two are shown in FIGS. 1-3. Referring now to FIG. 1, a weather strip seal 1 is continuously attached to one of an edge of a door 2 or the vehicle body 3 of a motor vehicle. Referring in addition now to FIG. 2, weather strip seal 1 includes a base portion 11 mounted to edge 5 of center pillar 4. A folded end portion 13 forms the tubular sealing portion 12. The folded end portion 13 is continued to the unfolded tubular portion through an inclined portion having a height gradually increasing from the folded end portion 13 to the unfolded tubular portion. This results in the thus formed tubular sealing portion 12 naturally continuing from the folded end portion 13 to the unfolded tubular portion 12.

As shown in FIG. 3, an inner panel 10 of a door 2 has nearly perpendicularly intersecting surfaces forming an L-shaped cross section with each other along a periphery thereof. An extruded weather strip 1A made of sponge rubber is attached to one of the above two surfaces through a retainer 6. The weather strip 1A has a thick-walled base portion 11 and a tubular sealing portion 12 which are integrally formed by extrusion.

The present weather strip door seal embodiment advantageously provides a weather strip door seal arrangement having reduced manufacturing costs and enhanced durability.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to one embodiment, an automotive vehicle including a vehicle body having a passage receiving a door is described. At least two sealing elements are located between the door and the vehicle body. A first sealing element comprises a resilient surface portion and a relatively more rigid body portion shaped to engage a body flange to seal an upper region of the passage. A second sealing element is provided which comprises a resilient section and a base section adapted to mate with a door panel to seal a lower region of the passage.

According to a second embodiment, an automotive vehicle including a body having a flange defining a passage is provided. A door closes the passage. A first sealing element having a flange receiving channel and a generally tubular element is provided. The first sealing element covers an upper region of the flange. The body also includes an interior lining encompassing at least a portion of said flange and creating a pair of pockets receiving first and second ends of the first sealing element. A second sealing element has a base adapted for mounting to a door and a tubular element extending from the base. The door includes an interior lining defining pockets receiving ends of the second sealing element.

According to a further embodiment, a seal for a motor vehicle door passage is provided. The seal includes a body side component and a door side component. The body side component is comprised of a tubular section and a main body section shaped to receive a flange. The door side component is comprised of a tubular section and a base adapted for mounting to a substantially planar door edge. The body side compartment seals an upper region of the passage and the door side compartment seals a lower region of the passage.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 1 is a prior art door sealing arrangement;
FIG. 2 is a perspective view of a prior art body side seal;
FIG. 3 is a perspective view of a prior art door side seal.

DETAILED DESCRIPTION

Figure 4:
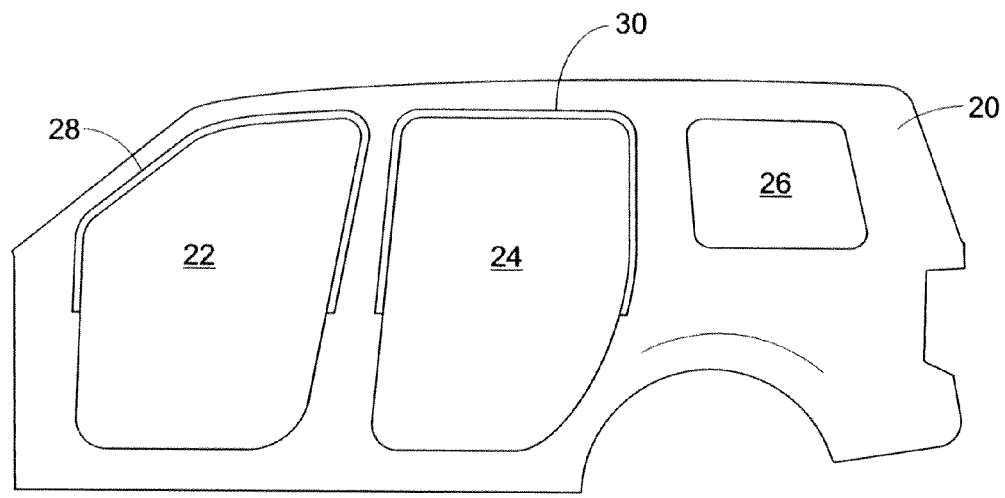
FIG. 4 is a side elevation view of a vehicle body panel in accord with the present disclosure.

One or more embodiments or implementations are hereinafter described in conjunction with the drawings, where like reference numerals are used to refer to like elements throughout, and where the various features are not necessarily drawn to scale.

With reference to FIGS. 4-7, a vehicle left side panel 20 is depicted. Side panel 20 includes a forward passage 22 receiving a driver side door 32. A rear seating area access passage 24 is provided which receives a second door assembly (not shown). A storage compartment window passage 26 is similarly provided. Surrounding an upper region of door passages 22 and 24 are body side seal elements 28 and 30, respectively.

Figure 5:
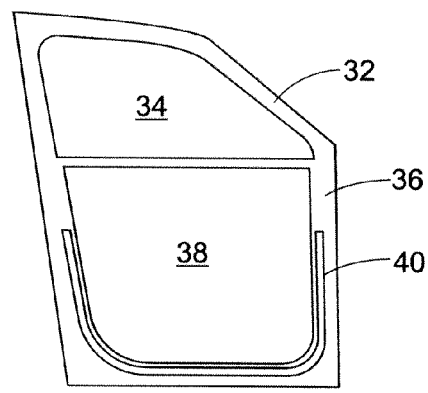
FIG. 5 is a side elevation view of a vehicle door in accord with the present disclosure.

Referring now specifically to FIG. 5, door 32 includes a planar edge 36 surrounding a raised shell portion 38 forming an internal cavity which contains door elements such as a window lift mechanisms, wiring etc. In a closed position, door edge 36 overlaps side side panel 20. Secured to door edge 36 (or optionally to a lateral wall of raised portion 38) is a door side seal element 40. In a door closed condition, seal element 40 is compressed between door 32 and side panel 20. As is visually apparent, seal element 28 and seal element 40 are cooperatively shaped to provide a contiguous weather strip seal surrounding passage 22, and in a door closed condition, seal passage 22 from the ingress of fluids.

The seal elements 28 and 40 can be comprised of any type of a resilient polymeric material, with rubbers being suitable and ethylene propylene diene monomer rubber (EPDM) being one example. Advantageously, locating the lower sealing element on the door allows wear issues to be minimized. Accordingly, the requirement to form a solid skin layer on an EPDM foam can be eliminated and a significant cost savings achieved.

Figure 6:
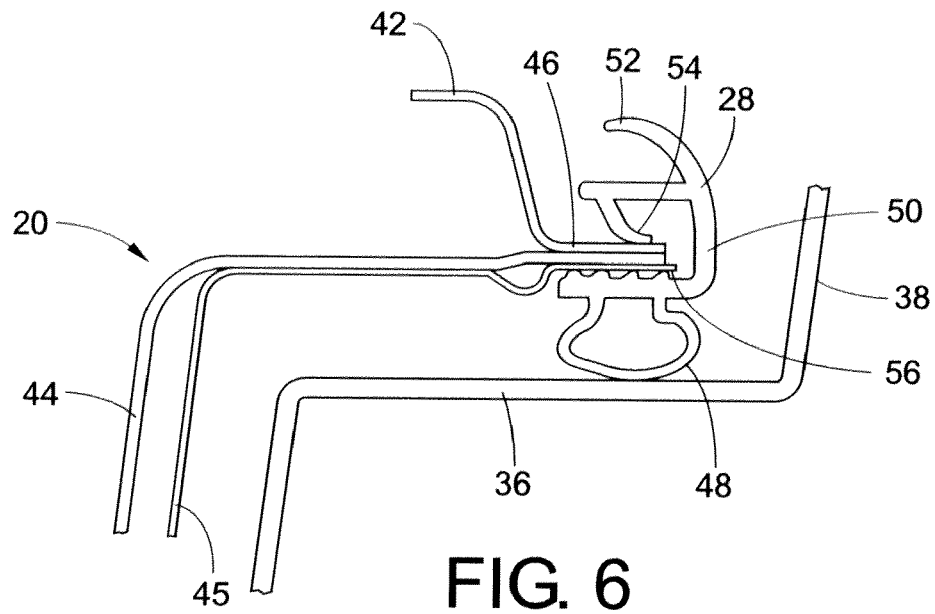
FIG. 6 is a cross-section view of the vehicle body side lining assembly.

Referring now to FIG. 6, a more detail depiction of the construction of seal elements 28 and 40 is provided. Side panel 20 includes a inner wall 42, a center wall 44 and an outer wall 45 which are stamped together to form a flange region 46. Of course, the present seal element is compatible with any manner in which side panel 20 is formed. The seal element 28 includes a resilient tubular section 48, secured to a main body section 50 and a tail section 52 which interacts with an interior vehicle lining to provide a sound barrier.

Figure 8:
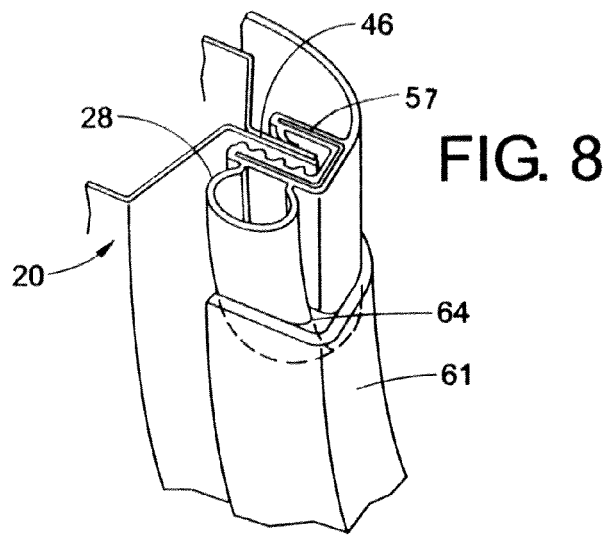
FIG. 8 is a perspective view of the vehicle body side seal assembly.
Figure 10:
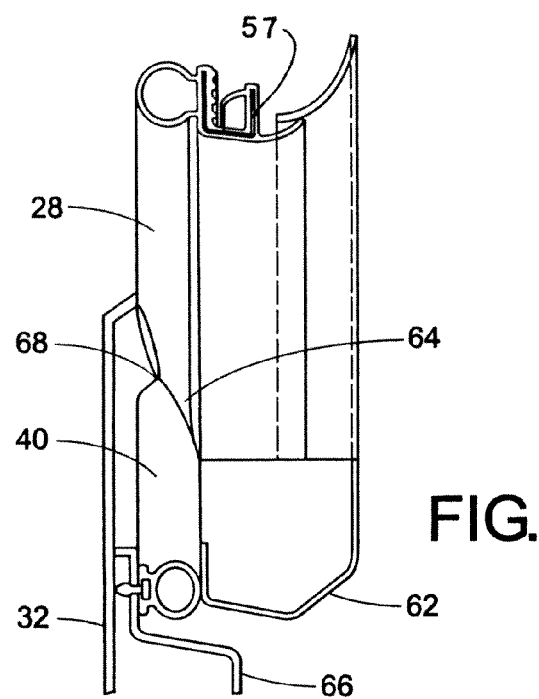
FIG. 10 is a cross-section view showing the interface between the door and vehicle body seals.

Main body section 50 is formed to receive flange 46 between arm 54 and dimpled wall 56. Main body 50 can be reinforced with an imbedded metal insert 57 as seen in FIGS. 8 and 10. In the depicted closed position, door lining 36 impacts tubular portion 48, compressing the same, and forming a weather seal between side panel 20 and door 32, effectively sealing the upper region of passage 22.

Figure 7:
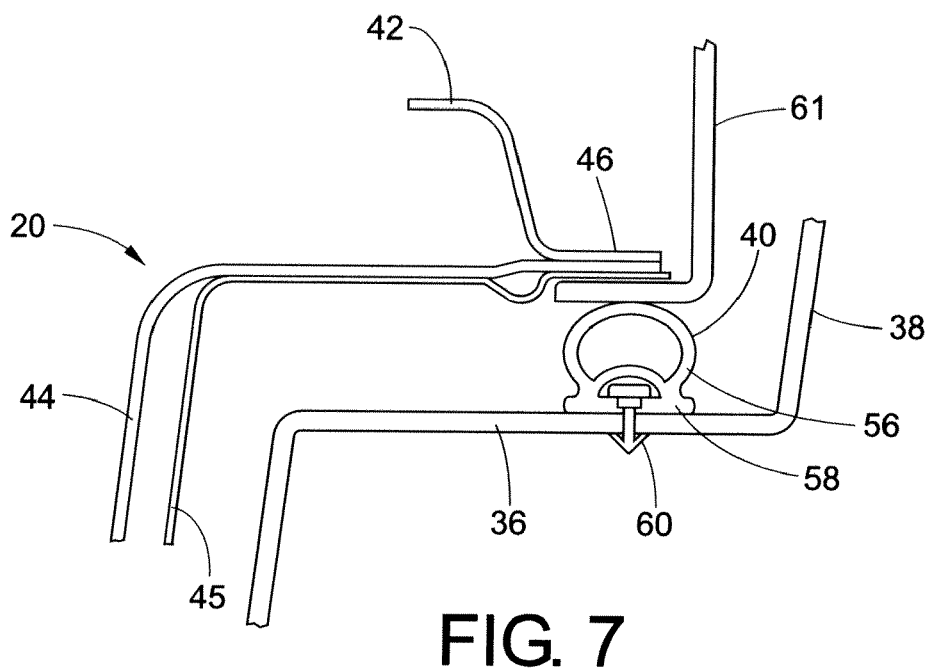
FIG. 7 is a cross-section view of the door side lining assembly.

Referring now to FIG. 7, the door side seal element 40 is depicted in greater detail. More particularly, base portion 58 includes clips 60. Clips 60 function to retain the door side seal element 40 via insertion in holes through door edge 36. In a closed position, an effective seal is formed by compression of tubular region 56 of door side weather seal element 40 against the combination of flange 46 and plastic interior lining 61 on the vehicle center pillar on vehicle side panel 20.

Referring now to FIG. 8, a transition zone between upper weather sealing region and lower weather sealing region is created by providing an interior vehicle lining 61 secured to the vehicle side panel 20 and wrapping around flange region 46 to form pocket 64. Pocket 64 receives upper weather stripping seal 28. Advantageously, this allows complicated molding processes used to form the end of the tubular seal section to be avoided.

Figure 9:
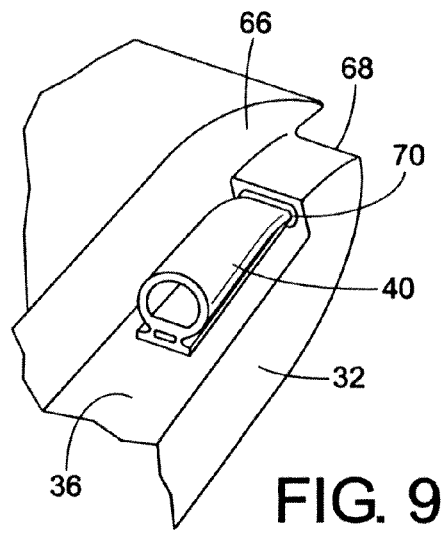
FIG. 9 is a perspective view of the door side seal assembly.

Referring now to FIG. 9, a similar arrangement is provide on the door side. Door 32 includes seal element 40 secured to door edge 36. Particularly, door 32 also includes a lining 66 that covers raised shell portion 38 and includes at an upper edge 68 a pocket 70 that receives an end of door seal element 40.

The interaction of these elements can be fully interpreted from FIG. 10. More particularly, upper panel side seal element 28 is overlapped by the pocket 68 formed in door lining 66 adjacent its terminal end and door side seal element 40 is engaged at its terminal end by interior vehicle lining 62 adjacent the pocket 64 location.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An automotive vehicle including a vehicle body having a passage receiving a door, an interior lining mated to said vehicle body, at least two sealing elements located between said door and the vehicle body, a first sealing element comprising a resilient surface portion and a relatively more rigid body portion shaped to engage a body flange and seal an upper region of said passage, a second sealing element comprising a resilient section and a mating section secured to said door and adapted to seal a lower region of said passage in a closed door condition, wherein at least a portion of said interior lining overlaps said body flange and forms a pocket receiving an end of said first sealing element.

2. The vehicle of claim 1, wherein said more rigid body portion comprises a generally "U" shaped channel.

3. The vehicle of claim 2, wherein said channel comprises metal reinforced rubber and said mating section is secured to said door via at least one clip.

4. The vehicle of claim 1 wherein said resilient surface portion and said resilient section comprise elongated tubular areas.

5. The vehicle of claim 1 further comprising a door inner lining, said lining including a pocket that receives an end of said second sealing element.

6. The vehicle of claim 5 including two door inner lining pockets, each receiving an end of said second sealing element.

7. The vehicle of claim 1 including two interior lining pockets, each receiving an end of said first sealing element.

8. The vehicle of claim 5 wherein said door inner lining pocket overlaps said first sealing element and said interior lining pocket overlaps said second sealing element in a door closed condition.

9. An automotive vehicle including a vehicle body having a flange defining a passage, a door closing said passage, a first sealing element having a flange receiving channel and a generally tubular element, said sealing element having first and second ends and covering an upper region of said flange, said body further including an interior lining at least partially encompassing said flange and forming a pair of pockets receiving said first and second ends of the sealing element, a second sealing element having a base adapted for mounting to a door and a tubular element extending from said base, said door including an interior lining defining pockets receiving ends of said second sealing element.

10. The vehicle of claim 9 wherein said first and second sealing elements are comprised of EPDM.

11. The vehicle of claim 9, wherein said flange receiving channel includes a first wall having dimple protrusions.

12. The vehicle of claim 11 wherein said channel includes a second wall having an arm extending toward said first wall.

13. The vehicle of claim 9 wherein said second sealing element is mounted to said door via a plurality of clips inserted through holes.

14. A seal assembly for a motor vehicle door passage formed in a vehicle body, said seal including a body side component and a door side component, said body side component comprised of a tubular section and a main body section shaped to receive a flange, said door side component comprised of a tubular section and a base adapted for mounting to a substantially planar door edge, said body side component sealing an upper region of said passage and said door side component sealing a lower region of said passage, said assembly further including at least one lining mated to said door or said body, the lining including at least one pocket receiving an end of an associated door side or body side component.

15. The seal assembly of claim 14 including two interior lining pockets, each receiving an end of said body side component.

16. The seal assembly of claim 14 including two door lining pockets, each receiving an end of said door side component.

17. The seal assembly of claim 14 wherein said door side pocket overlaps said body side component and said body side pocket overlaps said door side component in a door closed condition.

18. An automotive vehicle including a vehicle body having a passage receiving a door, and at least two sealing elements located between said door and the vehicle body, a first sealing element comprising a resilient surface portion and a relatively more rigid body portion shaped to engage a body flange and seal an upper region of said passage, a second sealing element comprising a resilient section and a mating section adapted to mate with the door and seal a lower region of said passage in a closed door condition, and an interior lining mated to said body, wherein at least a portion of the interior lining overlaps said body flange and forms a pocket that receives an end of said first sealing element.

19. An automotive vehicle including a vehicle body having a passage receiving a door, said door including a lining, at least two sealing elements located between said door and the vehicle body, a first sealing element comprising a resilient surface portion and a relatively more rigid body portion shaped to engage a body flange and seal an upper region of said passage, a second sealing element comprising a resilient section and a mating section secured to said door and adapted to seal a lower region of said passage in a closed door condition, said door lining including a pocket that receives an end of said second sealing element.

20. The vehicle of claim 19 wherein said resilient surface portion and said resilient section comprise elongated tubular areas.

21. The vehicle of claim 19 wherein said pocket overlaps a portion of said first sealing element in a closed door condition.

\* \* \* \* \*